United States Patent [19]

Okazaki et al.

[11] Patent Number: 5,168,553
[45] Date of Patent: Dec. 1, 1992

[54] LINE FIGURE ENCODER

[75] Inventors: Akio Okazaki; Osamu Hori, both of Yokohama, Japan

[73] Assignee: Kabushiki Kaisha Toshiba, Kawasaki, Japan

[21] Appl. No.: 607,630

[22] Filed: Oct. 30, 1990

Related U.S. Application Data

[63] Continuation of Ser. No. 269,125, Nov. 9, 1988, abandoned.

[30] Foreign Application Priority Data

Nov. 12, 1987 [JP] Japan ................. 62-285903

[51] Int. Cl.⁵ ............................................. G06F 15/62
[52] U.S. Cl. ................................ 395/143; 395/141; 395/142; 382/13; 382/23; 382/24
[58] Field of Search ............... 364/518, 521; 340/706, 340/747; 382/3, 13, 24, 33, 55, 59; 395/141, 142, 143

[56] References Cited

U.S. PATENT DOCUMENTS

| | | | |
|---|---|---|---|
| 4,561,061 | 12/1985 | Sakamoto et al. | 364/518 |
| 4,607,386 | 8/1986 | Morita et al. | 382/13 |
| 4,685,142 | 8/1987 | Ooi et al. | 382/13 |
| 4,748,443 | 5/1988 | Vehara et al. | 340/751 |
| 4,757,549 | 7/1988 | Machart et al. | 382/3 |
| 4,800,510 | 1/1989 | Vinberg et al. | 364/521 |
| 4,807,142 | 2/1989 | Agarwal | 364/200 |
| 4,847,605 | 7/1989 | Callahan et al. | 340/709 |

FOREIGN PATENT DOCUMENTS 2121534A 4/1983 United Kingdom .

OTHER PUBLICATIONS

Tsunekawa, S., "Automatic Drawing Reader-Tosgraph", Systems and Computers in Japan, vol. 17, No. 4, Apr. 1986, pp. 1–8.

Kim, R. I., et al., "Automatic Fingerprint Verification System Digital Image Processing Algorithm", Proc. of Region 10 Conf.: Computers and Communications Technology Toward 2000, Aug. 28, 1987, pp. 66–70.

Bookstein, F. "Fitting Conic Sections to Scattered Data", Computer Graphics and Image Processing, vol. 9, 1979, pp. 56–71.

Okazaki et al., "An Automatic Circuit Diagram Reader with Loop-Structure-Based Symbol Recognition," IEEE Transactions on Pattern Analysis and Machine Intelligence, vol. 10, No. 3, May 1988, pp. 331–341.

Arcelli, "Pattern Thinning by Contour Tracing," Computer Graphics and Image Processing, 17, 1981, pp. 130–144.

Primary Examiner—Gary V. Harkcom
Assistant Examiner—Phu K. Nguyen
Attorney, Agent, or Firm—Foley & Lardner

[57] ABSTRACT

A method and an apparatus for line figure encoding capable of reducing the amount of information required to be supplied and of encoding line figures correctly even when original images contain errors. In encoding the line figures, points are specified by a pointer in the vicinity of line figures to be encoded as a single connected line piece on displayed images. The line figures indicated to be a single connected line piece are extracted as the single connected line piece, and the line figures extracted as the single connected line piece are encoded as the single connected line piece.

12 Claims, 3 Drawing Sheets

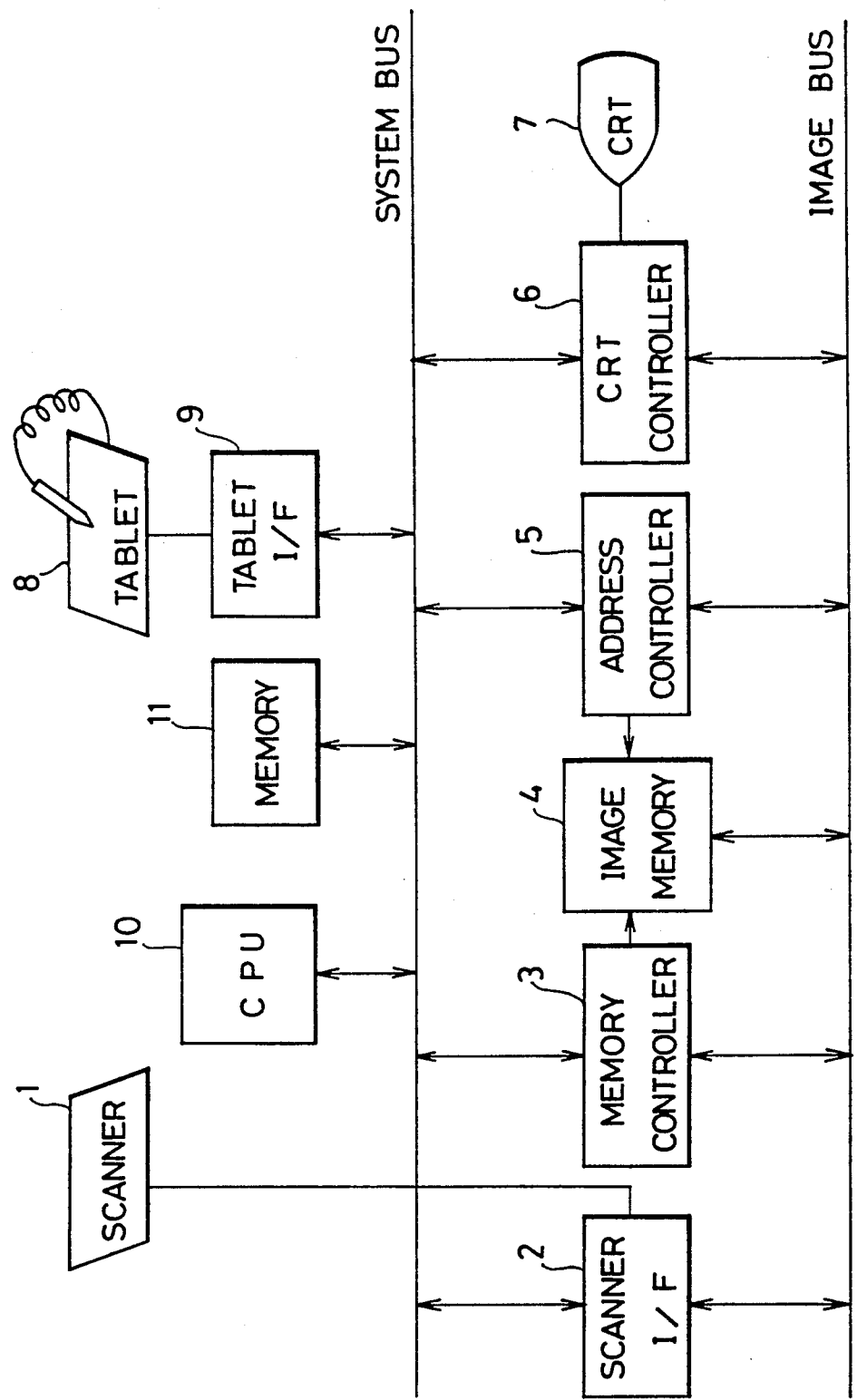

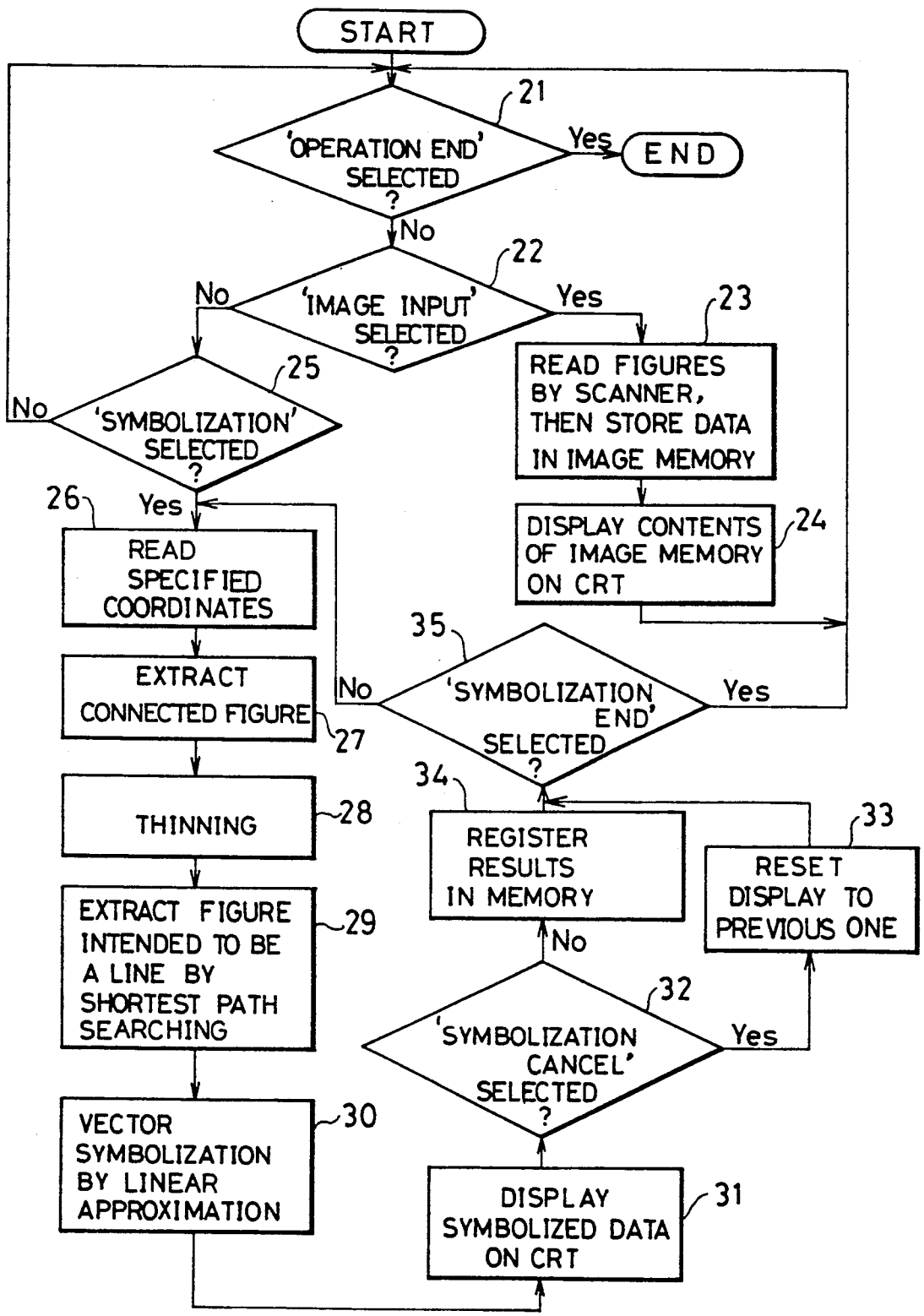

LINE FIGURE ENCODER

This application is a continuation of application Ser. No. 07/269,125, filed Nov. 9, 1988, now abandoned.

BACKGROUND OF THE INVENTION

1. Field of the Invention

The present invention relates to a line figure encoder for encoding figures primarily comprised of lines, such as drawings or maps, so as to facilitate registration of such figures to computers.

2. Description of the Prior Art

Recently, much efforts has been made to develop computerized administration systems for figures primarily comprised of lines, such as logical circuit diagrams, architectural drafts, or maps, by encoding such figures in forms, for example, of vector data in order to register such figures to computers.

One conventional method for executing this registration of the figures is to specify each point on the figures and to represent the figures by the sets of coordinates of the specified points and to register these sets of coordinates as figure data to computers by means of a digitizer. In this method, it is necessary to specify quite a large number of points, and this aspect makes this method extremely inefficient.

Another conventional method for executing the registration of the figures is to record the figures in an image memory by means of an imaging device and to extract figure data automatically by methods of pattern recognition. In this method, there may be recognition errors when the figures include a segment appearing to be disconnected but intended to be connected (referred hereafter as a cut) or a segment appearing to be connected but intended to be disconnected (referred hereafter as a tie), and corrections of such errors require enormously cumbersome procedures.

SUMMARY OF THE INVENTION

It is therefore an object of the present invention to provide a line figure encoder in which the registration of the figures can be accomplished by simple operations, and in which the correct figure data can be registered even when the figures include cuts or ties.

According to one aspect of the present invention there is provided a line figure encoder, comprising: image memory means for recording images; display means for displaying the images recorded in the image memory means; pointing means for providing a way to specify points on the images displayed on the display means; means for extracting images of line figures indicated as a single connected line piece in the way provided by the pointing means; and means for symbolizing the images of line figures extracted by the extracting means.

According to another aspect of the present invention there is provided a line figure encoder, comprising: image memory means for recording image data of images; display means for displaying the images recorded in the image memory means; pointing means for providing a way to specify points on the images displayed on the display means; means for thinning the images displayed on the display means; means for determining the shortest path joining points closest to the specified points in the thinned figure obtained by the thinning means; and means for symbolizing the shortest path determined by the determining means.

Other features and advantages of the present invention will become apparent from the following description taken in conjunction with the accompanying drawings.

BRIEF DESCRIPTION OF THE DRAWINGS

FIG. 1 is a block diagram of one embodiment of a line figure encoder according to the present invention.

FIG. 2 is a flow chart of the operation of the line figure encoder shown in FIG. 1.

DETAILED DESCRIPTION OF THE PREFERRED EMBODIMENTS

Figure 3A:
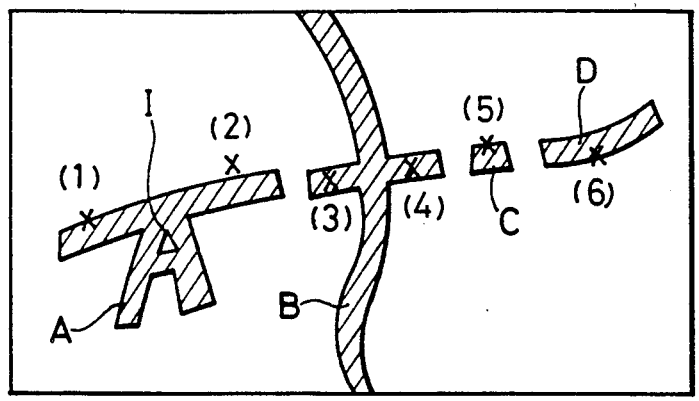
FIGS. 3(a), (b), (c), and (d) are illustrations of line figures for explaining the operation of the line figure encoder shown in FIG. 1.

Referring now to FIG. 1, there is shown one embodiment of a line figure encoder according to the present invention.

This line figure encoder comprises a scanner 1 including an image sensor which scans images of line figures and produces binary figure data in which '0' represents a background portion (a white picture element) while '1' represents a line portion (a black picture element), a scanner interface 2, a memory controller 3 for controlling the recording of figure data, an image memory 4 for recording the figure data, an address controller 5 for controlling the addresses in the image memory 4, a CRT controller 6 for controlling the displaying of the line figure images, a CRT display 7 for displaying the line figure images, a tablet 8 on which an operator enters commands for the operation of the line figure encoder and specifies points on the figures displayed on the CRT display 7, a tablet interface 9, a CPU 10 for controlling the operation of the line figure encoder as well as for performing extraction of the figure data and symbolization of the figure data such as vectorization in accordance with the commands entered at the tablet 8, and a memory 11 for storing the symbolized data which may subsequently be recorded on memory disks or transmitted to another computers.

As shown in FIG. 1, the scanner interface 2, the memory controller 3, the address controller 5, the CRT controller 6, the tablet interface 9, the CPU 10, and the memory 11 are connected to a system bus, while the scanner interface 2, the memory controller 3, the image memory 4, the address controller 5, and the CRT controller 6 are connected to an image bus. The scanner 1 is connected to both the system bus and the image bus through the scanner interface 2, the CRT display 7 is connected to both the system bus and the image bus through the CRT controller 6, and the tablet 8 is connected to the system bus through the tablet interface 9.

Referring now to FIGS. 2 and 3, the operation of the line figure encoder of FIG. 1 will be explained. FIG. 2 shows the flow chart of the operation performed by the CPU 10. The operation shown in FIG. 2 will be explained in the following for the exemplary case of line figure encoding of the figure shown in FIG. 3.

The CPU 10 operates interactively with the operator who gives the commands which control the operation of the CPU 10 and supplies information necessary in the course of the operation, through the tablet 8. The commands that the operator gives comprises menus of operation consisting of 'operation end', 'image input', 'symbolization', 'symbolization cancel', and 'symbolization end'. When the operator makes the selection at the tablet 8, the CPU 10 performs the corresponding operation.

Thus, at the step 21 whether the menu 'operation end' is selected is determined. If so, the operation ends. Otherwise the operation proceeds to the step 22. At the step 22, whether the menu 'image input' is selected is determined. If so, the image taken by the scanner 1 is stored as the figure data in the image memory 4 at the step 23, and this image is displayed on the CRT display 7 for inspection by the operator at the step 24, and then the operation returns to the step 21. Otherwise, the operation proceeds to the step 25. At the step 25, whether the menu 'symbolization' is selected is determined. If not, the operation returns to the step 21. If so, the following process of symbolization is carried out.

Now, upon selecting the menu 'symbolization', the operator is to specify the points on the figures displayed on the CRT display 7 which indicate a single connected line piece. Namely, let the figures displayed be those shown in FIG. 3(a), and let the transverse portions of the FIGS. A, B, C, D straddling across the display from left to right be what is intended to be a single connected line piece, with cuts between each of the figures A, B, C, D and ties from what appears as a letter 'A' adhered to the transverse portion of the FIG. A and from the vertical portion crossing over the transverse portion of the FIG. B. The rules to be obeyed by the operator in specifying points are as follows:

(a) specify a point in the vicinity of each figure which is to be a part of a single connected line piece.

(b) when one such figure contains more than one line piece, specify more than two points in the vicinity of the figure such that a line joining these points in or around the figure distinctively single out a line piece in the figure.

Thus in FIG. 3(a), the points marked by the crosses with labels (1)–(6) are specified in the order indicated by the labels, which are read out at the step 26. Then at the step 27, connected figures corresponding to each of these specified points are determined. In this embodiment a connected figure corresponding to a point is the connected figure which is either containing the point or the nearest to the point. In FIG. 3(a), the points (1) and (2) correspond to the connected FIG. A, the points (3) and (4) correspond to the connected FIG. B, the point (5) corresponds to the connected FIG. C, and the point (6) corresponds to the connected FIG. D. The extraction of these connected figures are carried out by tracing out the boundaries of such figures. In practice, the region within which the tracing is carried out is specified in advance so as to avoid the unnecessary tracing such as one for the vertical portion of the FIG. B in this example beyond what is displayed. Also, the boundary of the inner hole such as the one marked as I in FIG. 3(a), which will be referred to hereafter as the interior boundary as opposed to the outer edges of the figures which will be referred to hereafter as the exterior boundary, is traced.

Figure 3B:
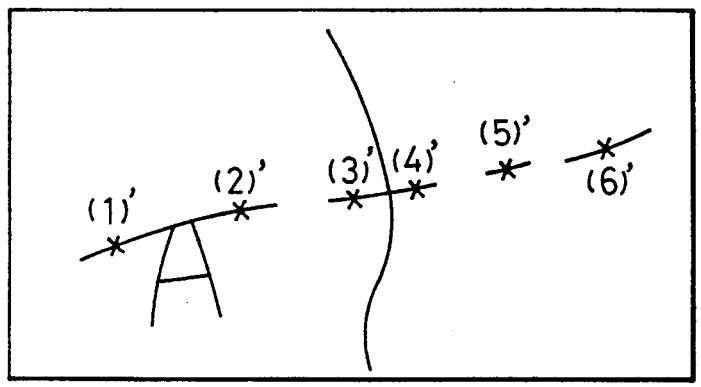

After the extraction of the connected figures at the step 27, the extracted figures are thinned at the step 28. The thinning can be performed by means of 3×3 logical mask processing applied as the boundaries are traced. By tracing the boundaries of the figure once, the figures are thinned by one picture element, and this is continued until the figures are thinned down to unit width. The thinning may be carried out alternatively for the exterior boundaries and for the interior boundaries. The result of the thinning of the figures in FIG. 3(a) is shown in FIG. 3(b) where the points with primed labels corresponds to the respective points with unprimed labels in FIG. 3(a). The points with primed labels are chosen to be the points on the thinned figures of FIG. 3(b) closest to the specified points in FIG. 3(a).

Then at the step 29, the shortest path in the thinned figures joining these points is determined. The use of the shortest path here eliminates the erroneous passage such as one between the points (1)' and (2)' through the letter 'A' like portion of the FIG. A, so that the unique identification of the line piece specified is possible. Thus the ties such as the letter 'A' like portion of the FIG. A and the vertical portion of the FIG. B can be removed in this embodiment, provided that the points are specified correctly. When the figures contain cuts between the two sequential points such as between the points (2)' and (3)', (4)' and (5)', and (5)' and (6)', the end points of the figures containing each of these points are joined together by straight lines as shown in FIG. 3(c), so that the cuts can also be removed in this embodiment.

Figure 3C:
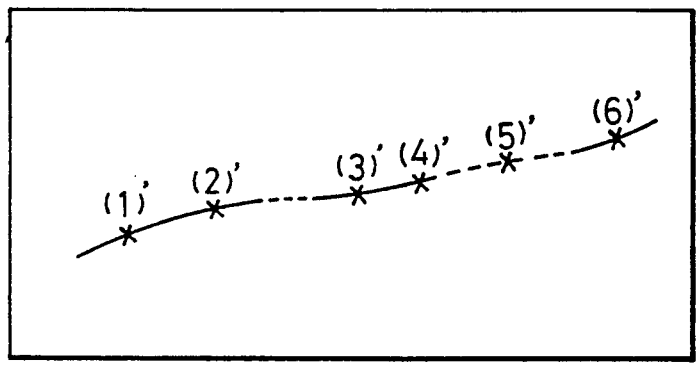
Figure 3D:
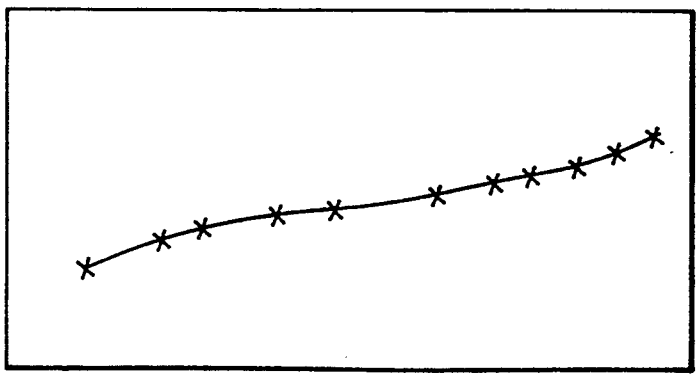

Then at the step 30, the connected line piece shown in FIG. 3(c) obtained at the step 29 is symbolized in the manner of vector symbolization by linear approximation, i.e., the straight lines are fitted to the connected line piece and the connected line piece is represented by the coordinates of the junctions between the straight lines, as shown in FIG. 3(d). The result of this symbolization is displayed on the CRT display 7 for inspection by the operator at the step 31.

When an error in the symbolization is detected in the inspection by the operator, the operator can select the menu 'symbolization cancel' in order to correct the error. The step 32 determines whether this is the case. If not, the operation proceeds to the step 34 in which the result of the symbolization is registered in the memory. Otherwise the display of the latest symbolization is deleted and the image displayed previously before the last symbolization is returned to the CRT display 7, so that the operation of the symbolization may be repeated, in which the operator can correct the error found before, until the menu 'symbolization end' is selected. The step 35 determines whether the menu 'symbolization end' is selected. If not, the operation of symbolization from the step 26 on is repeated. Otherwise the operation returns to the initial step 21.

As explained, according to this embodiment, the symbolization of the figure is achieved by specifying few points on figures displayed and extracting the figure intended to be a single connected line piece automatically in accordance with the specified points, and symbolizing the extracted figure automatically, so that the number of the points to be specified by the operator can be reduced considerably and the operation by the operator can be made very simple.

Furthermore, according to this embodiment, the cuts or the ties due to blurring or smearing can be removed by following the simple instruction in specifying the points and the correct figure data can be registered automatically.

It is to be noted that the linear approximation used in the above embodiment may be replaced by a curve approximation or by a combination of the linear and curve approximations. Also, the interpolation of the figures over the cuts by means of straight lines can be replaced by one using means of curves such as spline interpolation. Also, the image reading by means of the scanner can be replaced by an image reading from a recording device such as an optical disk device of a recorded image. Also, the tablet can be replaced by a mouse. Furthermore, the specification of the points can be replaced by a tracing of the figures on the display and the sampling of the points at certain timings.

Besides these, many modifications and variations of this embodiment may be made without departing from the novel and advantageous features of the present invention. Accordingly, all such modifications and variations are intended to be included within the scope of the appended claims.

What is claimed is:

1. A line figure encoder capable of encoding line figures containing ties and cuts, comprising:

an image memory recording images containing line figures to be encoded;

a display displaying said images recorded in said image memory;

pointing means for specifying points in a vicinity of said line figures to be encoded as a single connected line piece, in said images displayed on said display, wherein;

one point is specified for each line figure to be part of said single connected line piece as a whole; and two points are specified for each line figure, of which only a section is to be part of said single connected line piece, wherein a line joining said two points indicates said section which is to be part of said single connected line piece;

extracting means for extracting said line figures indicated to be said single connected line piece by said pointing means, by tracing boundaries of said line figures containing specified points when points are specified on said line figures by said pointing means, and by tracing boundaries of line figures closest in distance to specified points when points specified are off said line figures, said extracting means further comprising:

means for thinning said images displayed by said display; and means for selecting corresponding points on said thinned images, wherein said corresponding points are those points on said thinned images which are closest in distance to said specified points, thereby eliminating any ties and cuts contained in the line figure; and encoding means for encoding said line figures extracted by said extracting means as said single connected line piece.

2. A line figure encoder of claim 1, wherein said extracting means includes interpolating means for interpolating a gap between two line figures designated by said pointing means as line figures to be encoded as said single connected line pieces.

3. A line figure encoder of claim 1, wherein encoding by encoding means includes vector symbolization using straight lines.

4. A line figure encoder of claim 1, wherein encoding by the encoding means includes vector symbolization using straight lines and curves.

5. A line figure encoder of claim 2, wherein interpolation by said interpolating means includes interpolation by straight lines.

6. A line figure encoder of claim 2, wherein interpolation by said interpolating means includes spline interpolation.

7. A method of line figure encoding capable of eliminating any ties and cuts contained in a line figure, comprising the steps of:

recording images containing line figures to be encoded in an image memory;

displaying images recorded in said image memory;

specifying images recorded in said image memory;

specifying points by a pointer in a vicinity of said line figures to be encoded as a single connected line piece, in the displayed images, wherein;

one point is specified for each line figure to be part of said single connected line piece as a whole; and two points are specified for each line figure, of which only a section is to be part of said single connected line piece, wherein a line joining said two points indicates said section which is to be part of said single connected line piece;

extracting line figures indicated to be said single connected line piece by said pointer as said single connected line piece by tracing boundaries of line figures containing specified points when points are specified on line figures by said pointer, and by tracing boundaries of line figures closest in distance to specified points when points specified are off line figures, said extracting step further including the steps of:

thinning said displayed images; and selecting corresponding points on said thinned images, wherein said corresponding points are those points on said thinned images which are closest in distance to said specified points, thereby eliminating any ties and cuts contained in the line figure; and encoding line figures extracting as said single connected line piece.

8. A method of claim 7, wherein said extracting step includes the step of interpolating a gap between two line figures designated by the pointer as line figures to be encoded as said single connected line piece.

9. A method of claim 7, wherein said encoding includes vector symbolization using straight lines.

10. A method of claim 7, wherein said encoding includes vector symbolization using straight lines and curves.

11. A method of claim 8, wherein said interpolating includes interpolation by straight lines.

12. A method of claim 8, wherein the interpolating includes spline interpolation.

* * * * *